(No Model.)
B. J. BROWN, Jr.
CONE FOR FORMING HAT BODIES.
No. 464,422.　　　　　　　　　　Patented Dec. 1, 1891.
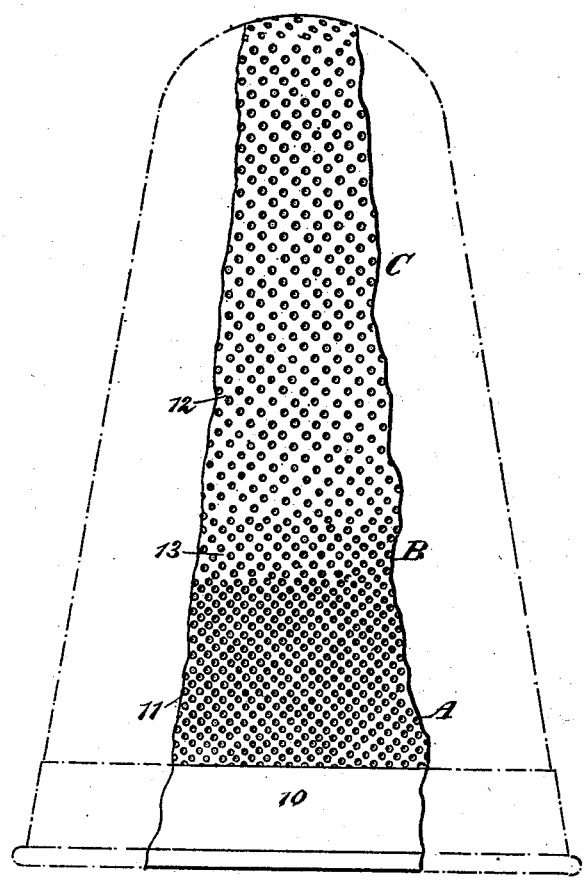
WITNESSES:　　　　　　　　　　INVENTOR:
　　　　　　　　　　　　　　　　B. J. Brown Jr.
　　　　　　　　　　　　　　　　BY Munn & Co.
　　　　　　　　　　　　　　　　ATTORNEYS

UNITED STATES PATENT OFFICE.

BENJAMIN JAMES BROWN, JR., OF BROOKLYN, NEW YORK.

CONE FOR FORMING HAT-BODIES.

SPECIFICATION forming part of Letters Patent No. 464,422, dated December 1, 1891.

Application filed April 13, 1891. Serial No. 388,715. (No model.)

*To all whom it may concern:*

Be it known that I, BENJAMIN JAMES BROWN, Jr., of Brooklyn, in the county of Kings and State of New York, have invented a new and Improved Cone for Forming Hat-Bodies, of which the following is a full, clear, and exact description.

My invention relates to an improvement in cones for forming hat-bodies from fur, wool, or a mixture with either as an element, and it further relates to an improvement upon the application for a similar device filed April 3, 1891, Serial No. 378,503.

The invention has for its object to dispense with a brim-board of any description, to regulate the suction, and to provide a cone by which, when suction is applied and material fed thereto, the said material will be absorbed in such manner as to produce a hat-body having the brim-section of a uniform and greater thickness than the crown-section, the thickness of the latter being also uniform, and also, if desired, cause the brim-section to gradually taper off into the crown-section.

A further object of the invention is to so construct the cone that each body formed thereon will be of the same thickness in its several parts, making a duplicate of each other.

The invention consists in the novel construction of the cone, as will be hereinafter fully set forth, and pointed out in the claims.

Reference is to be had to the accompanying drawing, forming a part of this specification, which represents the entire cone in dotted lines, a vertical section of the cone being illustrated in full lines.

The cone may be constructed of any desired material, but metal is preferably employed, and the entire surface of the cone is preferably perforated, excepting a narrow portion 10. The perforations in the cone are of the same diameter, but the perforations near the base are more closely grouped than those at the center and above the center. The perforations are, by reason of their grouping, formed practically into three belts A, B, and C, the belt A comprising the lowest closely-grouped perforations 11, the belt C the uppermost perforations 12, which are much more scattered than those at the base, and the intermediate belt B represents perforations 13, which are spaced a sufficient distance to gradually cause the belt B to merge into the formation of the belt C. The lowest belt A is of sufficient width only to form the brim-section of the hat-body, the size of the uppermost belt C essentially corresponds to that of the crown-section of the hat-body, and the intermediate belt B is quite narrow, being adapted to cause a gradual taper in the hat-body at the junction of the brim-section with the crown-section. The diameter of the apertures preferably employed is forty-five one-thousandths of an inch, and the said apertures in the belt A are grouped so that about two hundred and twenty-five of them are produced in a square inch. The apertures in the uppermost belt C are arranged so that about one hundred and thirteen of them are contained in a square inch, and the apertures in the intermediate belt B are so spaced that about one hundred and sixty-nine are grouped in a square inch. It will be observed that when a cone is constructed in this manner and suction is applied to it the fur flying around the cone will adhere in much greater thickness to the belt A, as the suction is greater at that point, than to either the intermediate belt or to the uppermost one; but more material will adhere proportionately to the intermediate belt than to the uppermost belt.

Having thus described my invention, I claim as new and desire to secure by Letters Patent—

1. A cone for forming hat-bodies, having its perforations of substantially the same diameter and more closely grouped at one portion of the cone than at others, whereby the thickness of the fur upon the cone is made to vary with the grouping, as specified.

2. A cone for forming hat-bodies, having perforations therein grouped in greater numbers to the square inch at the base than at the central and upper portions thereof, as specified.

3. A cone for forming hat-bodies, provided with perforations of substantially the same diameter, the said perforations being arranged in a base belt, an intermediate belt, and an upper belt, the perforations in the base belt being arranged in greater number to the square inch than those of the intermediate belt, and the perforations of the intermediate belt being arranged in greater number to the square inch than the perforations in the upper belt, as and for the purpose specified.

BENJAMIN JAMES BROWN, Jr.

Witnesses:
  JOHN MALCOLM,
  BENJAMIN J. BROWN.